United States Patent [19]
Calvert

[11] Patent Number: 6,007,658
[45] Date of Patent: Dec. 28, 1999

[54] CARTON SEALING METHOD UTILIZING RADIATION CURABLE PRESSURE-SENSITIVE ADHESIVES

[75] Inventor: Barry Gene Calvert, Covington, Va.

[73] Assignee: Westvaco Corporation, New York, N.Y.

[21] Appl. No.: 09/034,278

[22] Filed: Mar. 4, 1998

[51] Int. Cl.⁶ .............................. B32B 31/12; B31B 1/62
[52] U.S. Cl. .................. 156/217; 156/273.3; 156/275.7; 156/379.8; 156/443; 156/578; 493/131
[58] Field of Search ...................... 156/217, 227, 156/273.3, 275.3, 275.5, 275.7, 290, 291, 306.3, 379.6, 379.8, 443, 539, 578; 493/128, 130, 131

[56] References Cited

U.S. PATENT DOCUMENTS

| | | |
|---|---|---|
| Re. 33,376 | 10/1990 | Gibbons et al. . |
| 3,120,335 | 2/1964 | Egleston et al. . |
| 3,788,876 | 1/1974 | Baker et al. . |
| 3,850,085 | 11/1974 | Klemm ................................. 493/131 |
| 3,974,016 | 8/1976 | Bondybey et al. . |
| 4,156,626 | 5/1979 | Souder . |
| 4,397,415 | 8/1983 | Lisiecki . |
| 4,578,054 | 3/1986 | Herrin ................................. 493/131 |
| 4,605,578 | 8/1986 | Emrich et al. . |
| 4,637,199 | 1/1987 | Steck et al. . |
| 4,965,117 | 10/1990 | Lautenschlaeger et al. . |
| 4,968,558 | 11/1990 | Fisher et al. . |
| 5,113,479 | 5/1992 | Anderson et al. . |
| 5,462,797 | 10/1995 | Williams et al. . |
| 5,498,304 | 3/1996 | Shaw et al. . |
| 5,536,759 | 7/1996 | Ramharack et al. ..................... 522/35 |
| 5,565,250 | 10/1996 | Ohlsson et al. . |
| 5,670,260 | 9/1997 | Zajaczkowski et al. . |

Primary Examiner—Michael W. Ball
Assistant Examiner—Michael A Tolin
Attorney, Agent, or Firm—J. R. McDaniel; R. L. Schmalz

[57] ABSTRACT

This invention relates sealing of paperboard cartons in order to form an integral structural. Such structures of this type, generally, employ the use of radiation curable, pressure-sensitive adhesives and "spot curing" of the adhesives in order to seal and form the carton.

17 Claims, 3 Drawing Sheets

CARTON SEALING METHOD UTILIZING RADIATION CURABLE PRESSURE-SENSITIVE ADHESIVES

BACKGROUND OF THE INVENTION

1. Field of the Invention

This invention relates to sealing of paperboard cartons in order to form an integral structural. Such structures of this type, generally, employ the use of radiation curable, pressure-sensitive adhesives and "spot curing" of the adhesives in order to seal and form the carton.

2. Description of the Related Art

Flap or end sealing of cartons following or prior to product filling has relied on the use of cold adhesives, hot melt adhesives or heat sealable polymer coatings. Typically, carton lines advance at a rate of 100 to 300 fpm.

It is well known that cold adhesives are incompatible with the higher speeds due to their extended set time requirements. Also, hot melt adhesives are limited to only certain end-use conditions due to temperature sensitivity. Finally, polymer coatings are costly, if applied as a continuous film and require specialized application equipment if patterned only in the seal areas.

The latest attempt to solve this problem is through the utilization of patterned-applied heat sealable coatings. This requires specialized printing equipment and powerful, inefficient heating systems to render the coatings tacky/sealable on the cartoning forming line. A reasonable amount of compression must also be applied to obtain an effective seal; therefore, proximity of the seal area and carton style are limited.

Finally, it is known to employ various sealing methods in order to seal various paper/paperboard materials together. Exemplary of such prior art are U.S. Pat. No. 4,605,578 ('578) to R. Emrich et al., entitled "Method and Apparatus for Connecting Together Material Plies Which are Unilaterally Thermoplastically Coated", U.S. Pat. No. 4,637,199 ('199) to R. S. Steck et al., entitled "Induction Sealing of Paperboard", U.S. Pat. No. 5,113,479 ('479) to A. Anderson et al., entitled "Method of Infrared Heating a Restricted Area on a Continuous Thermoplastic Laminated Web", and U.S. Pat. No. 5,498,304 ('304) to N. W. Shaw et al., entitled "Method of Manufacturing Corrugated Board Using A Thermoradiate Energy Source". While the '578, '199, '479, and '304 patents disclose various types of energy for sealing webs of material, such as hot air, induction heating, infrared heating and radiant heating, respectively, there is no disclosure of the use of ultra-violet (UV) light or adhesives which can be cured by UV light.

It is apparent from the above that there exists a need in the art for a carton sealing system which is capable of sealing cartons through simplicity of parts and uniqueness of structure, and which at least equals the sealing characteristics of the known carton sealing systems, but which at the same time is capable of utilizing the more efficient UW light.

It is a purpose of this invention to fulfill this and other needs in the art in a manner more apparent to the skilled artisan once given the following disclosure.

SUMMARY OF THE INVENTION

Generally speaking, this invention fulfills these needs by providing a system for paperboard carton sealing utilizing ultraviolet (UV) radiation curable, pressure-sensitive adhesives, comprising a paperboard carton blank having at least one flap means, a pressure-sensitive adhesive application means for applying an adhesive to the flap means, a UV light source means which produces a UW light beam that is substantially focused upon the adhesive on the flap to substantially cure the adhesive, and a carton sealing/forming means which folds the flap means, and seals the flap means to the blank means to form a carton.

In certain preferred embodiments, the adhesives for the application disclosed are formulated to be pressure sensitive upon curing and are approximately 100% solids in content with essentially zero solvent content. Also, the UV light source operates between 300 and 400 nm. Finally, the carton sealing/forming means is comprised of rollers or belts.

In another further preferred embodiment, the system for paperboard carton sealing utilizing UV radiation curable, pressure-sensitive adhesives yields an efficient and flexible carton sealing system which does not restrict end-use conditions of the carton.

The preferred system, according to this invention, offers the following advantages: lightness in weight; good stability; good durability; increased economy; and excellent sealing characteristics. In fact, in many of the preferred embodiments, these factors of increased economy and excellent sealing characteristics are optimized to the extent that is considerably higher than heretofore achieved in prior, known carton sealing systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Cartons which are used for distributing, marketing, and in some cases, heating portions of prepared foods are fabricated from a paperboard structural substrate. In some applications the paperboard may be coated with a polymeric or similar material for barrier or aesthetic purposes. As mentioned earlier, there are three basic sealing techniques used in the packaging industry, to date, to seal the cartons, while being erected or following product filling. Each technique has met with some success, but all have limitations dictated either by line speed/efficiency, carton distribution parameters, or carton end use.

Figure 1:
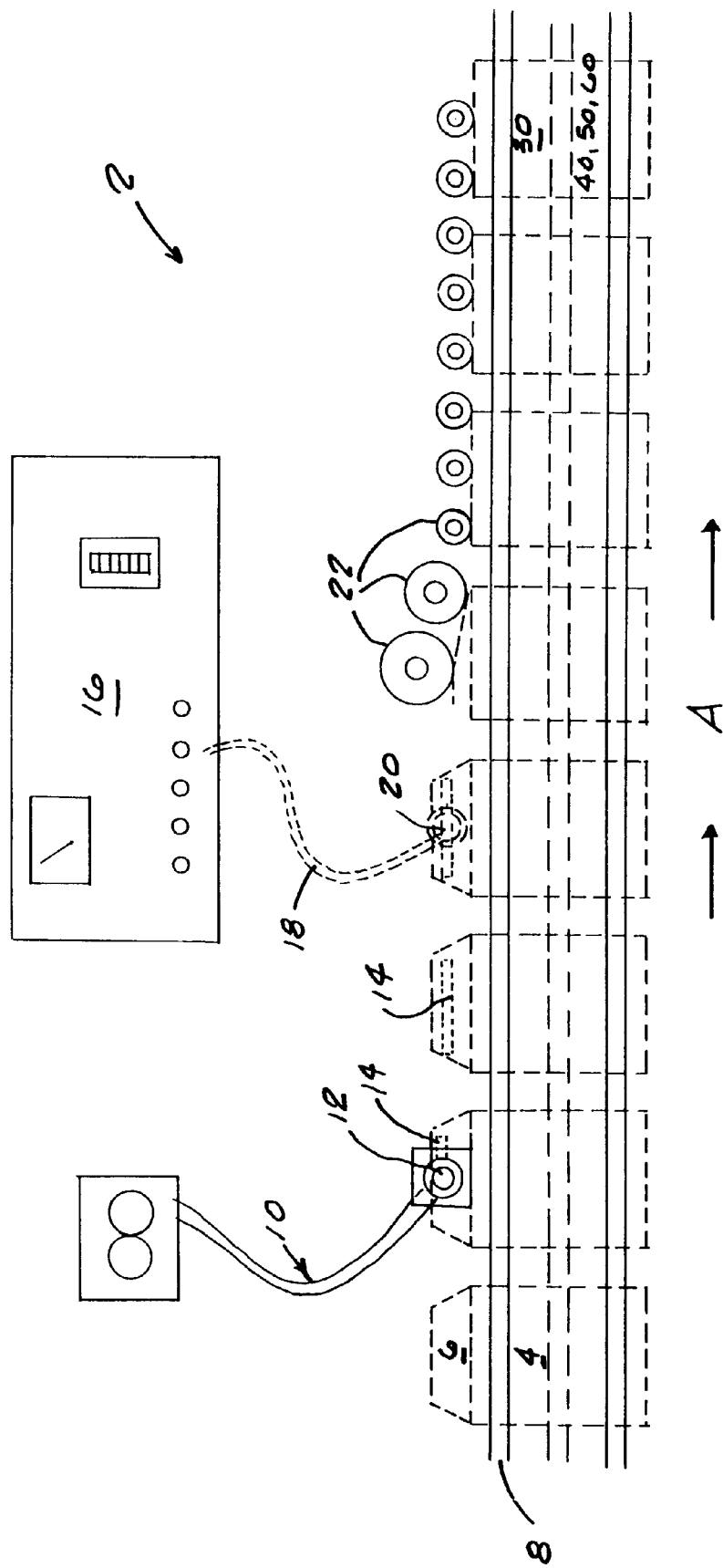
FIG. 1 is a schematic illustration of a system for paperboard carton sealing utilizing UW radiation curable, pressure-sensitive adhesives, according to the present invention.
Figure 2:
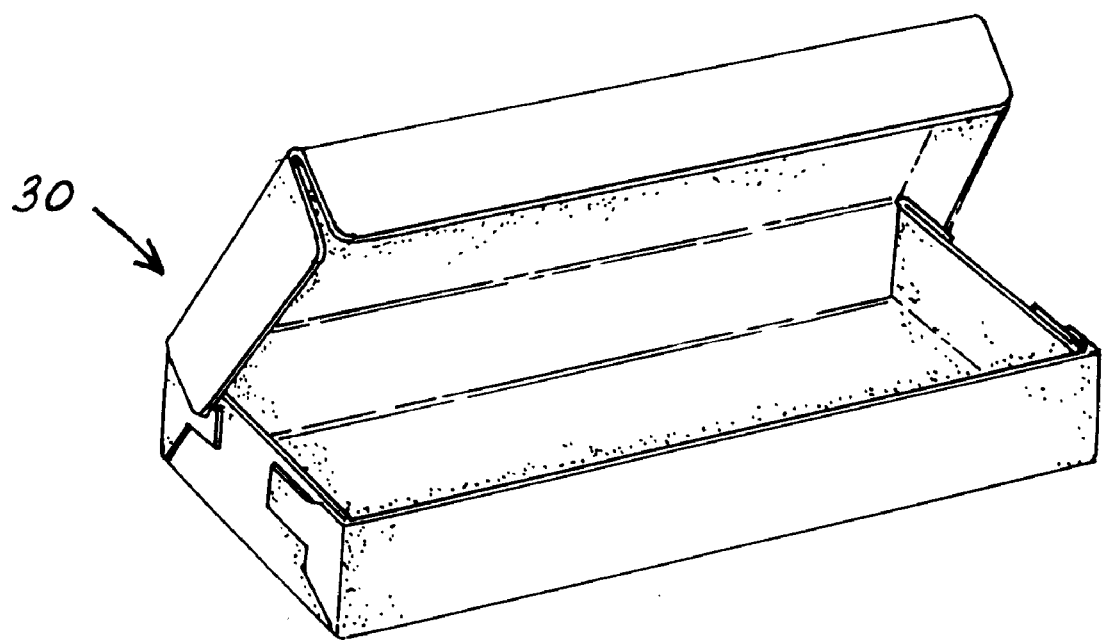
FIG. 2 is an isometric illustration of the carton prior to sealing, according to the present invention.
Figure 3:
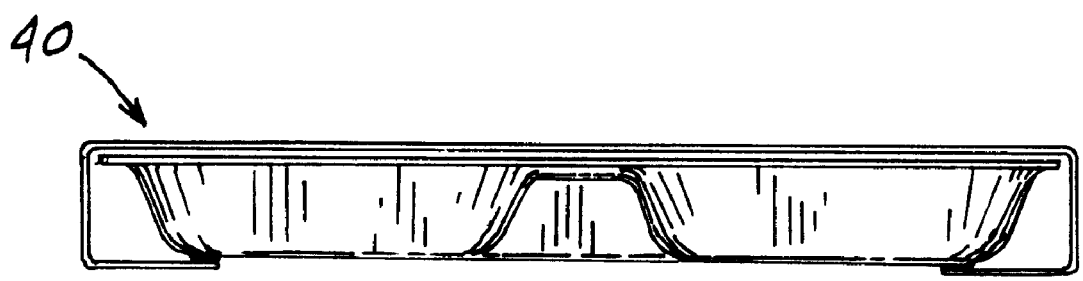
FIG. 3 is an end view of where the pressure-sensitive adhesive will be applied and cured and how the carton will appear when sealed, according to the present invention.
Figure 4:
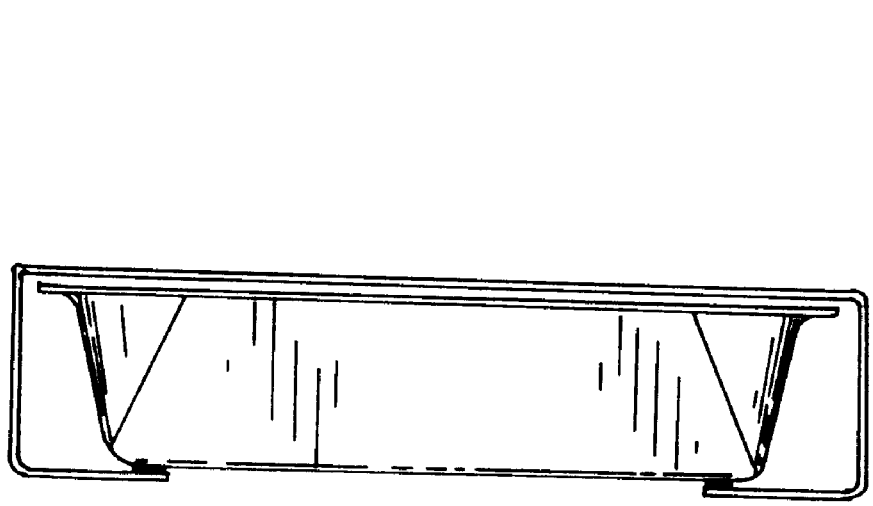
FIG. 4 is an end view of where the pressure-sensitive adhesive will be applied and cured and how another carton will appear when sealed, according to the present invention.
Figure 5:
FIG. 5 is an end view of where the pressure-sensitive adhesive will be applied and cured and how still another carton will appear when sealed, according to the present invention.

With reference to FIG. 1, there is illustrated an advantageous environment for the use of the concepts of this invention. FIG. 1 illustrates a system 2 for sealing paperboard cartons which utilizes ultra-violet (UV) radiation curable, pressure-sensitive adhesives. System 2 includes, in part, paperboard blank 4, flap 6, conventional conveying mechanism 8 which travels in the direction of arrow A, conventional adhesive delivery system 10 which delivers a UW radiation curable, pressure-sensitive adhesive to flap 6 along adhesive strip 14, conventional UV light source 16 and conduit 18 which deliver a UV light beam 20 onto adhesive strip 14 to cure adhesive strip 14, conventional flap foldover/compression section 22, and cartons 30, 40, 50 and 60.

The sealing of cartons 30, 40, 50 and 60 involves (1) an application of the UW curable adhesive prior to joining flap 6 to blank 4—an application to one surface only is usually sufficient; (2) exposing the pressure-sensitive adhesive strip 14 to a UV light beam 20 (UV energy is approximately 300 to 400 nm, preferably 365 nm) which immediately cures the adhesive and renders it pressure sensitive (tacky); and (3) joining and lightly compressing the flap 6 to blank 4 in section 22 so that cartons 30, 40, 50 and 60 can be sealed.

The application of the adhesive may be accomplished through conventional adhesive delivery system 10. The method chosen will depend on the area to be sealed and certain adhesive properties, such as viscosity. The application techniques include, but are not limited to extrusion, spraying and roll transfer. The proximity of the application process to the curing process is not critical; however, it is preferred to be as close as physically possible to limit space requirements.

The preferred method for UV curing the applied material is through the utilization of a UV light source 16 or "Spot Curing" unit. These units are manufactured by companies such as EFOS in Williamsville, N.Y., and UV Source Incorporated in Torrance, Calif. When UV curable adhesives are exposed to the light beam 20 from these units, photochemical initiators in the adhesives form free radicals. The free radicals initiate the cross linking of the monomers and oligomers, which results in a rapid curing of the adhesive.

Adhesives for the curing application for the present invention are formulated to be pressure sensitive upon curing. The preferred UV adhesives are approximately 100% solids in content, with essentially zero solvent content. It is also to be understood that adhesives may be formulated to yield a broad range of peel strength so that a seal may be peelable and resealable. For many carton applications seal strength becomes a function of the surface strength of the materials being bonded.

The "Spot Curing" unit 16, which is approximately the size of a desktop computer CPU, can be electronically tied into the sealing line so that a conventional electronic shutter (not shown) is opened only when blank 4 with adhesive strip 14 is present.

Joining of the surfaces to be sealed is performed immediately following exposure and curing of the adhesive strip 14 to the UV light beam 20. Open time before joining is not a critical parameter, as is with conventional systems. Light compression pressure in section 22 is necessary following joining of the surface. Section 22, preferably, is construed of a plurality of rollers or belts. Compression length can be reduced by 50% or more over conventional adhesive (cold glue or hot melt) systems.

As shown in FIGS. 2–5, cartons 30, 40, 50 and 60 can be formed by system 2. It must be pointed out that the flaps of cartons 30, 40, 50 and 60 vary greatly in size, shape and location, but system 2 can easily be adapted to such differences.

The method described herein can produce comparable or superior seals in less space on the sealing line, at comparable or faster line speeds, while using energy efficiently. Another benefit is that the adhesives used are somewhat flexible and not nearly as sensitive to temperature extremes as conventional adhesives.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A system for one-step paperboard carton sealing utilizing ultra-violet (UV) radiation curable, pressure-sensitive adhesives, wherein said system is comprised of:

a paperboard carton blank having at least one flap means;

a pressure-sensitive adhesive application means for applying an adhesive to said flap means;

a UV light source means which produces a UV light beam that is substantially focused upon said adhesive on said flap to substantially cure said adhesive wherein said light source means is located substantially adjacent to said adhesive application means; and a carton sealing/forming means which folds said flap means and seals said flap means to said blank means to form a carton wherein said carton sealing/forming means is located substantially adjacent to said light source means.

2. The system, as in claim 1, wherein said adhesive application means is further comprised of:

an adhesive extruding means.

3. The system, as in claim 1, wherein said adhesive application is further comprised of:

an adhesive spraying means.

4. The system, as in claim 1, wherein said adhesive application is further comprised of:

an adhesive roll transferring means.

5. A system, as in claim 1, wherein said UV light source means is further comprised of:

a UV light spot curing means.

6. The system, as in claim 1, wherein said carton sealing/forming means is further comprised of:

a plurality of rollers or belts.

7. The system, as in claim 1, wherein said carton sealing/forming means is further comprised of:

a plurality of rollers and belts.

8. The method of one-step paperboard carton sealing, wherein said method is comprised of the steps of:

placing a paperboard carton blank having at least one flap on a conveying means;

transporting by said conveying means said blank to an adhesive delivery means;

applying a pressure-sensitive, ultra-violet (UV) curable adhesive substantially on said flap with an adhesive application means;

transporting by said conveying means said blank to a UV light source means wherein said light source means is located substantially adjacent to said adhesive application means;

curing said adhesive by subjecting said adhesive to a UV light from said UV light source means;

transporting by said conveying means said blank to a carton sealing/forming means wherein said carton sealing/forming means is located substantially adjacent to said light source means; and sealing and forming said blank into a carton.

9. The method, as in claim 8, wherein said adhesive application means is further comprised of:

an adhesive extruding means.

10. The method, as in claim 8, wherein said adhesive application means is further comprised of:

an adhesive spraying means.

11. The method, as in claim 8, wherein said adhesive application means is further comprised of:

an adhesive roll transferring means.

12. The method, as in claim 8, wherein said UV light source means is further comprised of:

a UW light spot curing means.

13. The method, as in claim 12, wherein said UV light curing means operates over a range of 300–400 nm.

14. The method, as in claim 13, wherein said UV light curing means operates at approximately 365 nm.

15. The method, as in claim 8, wherein said adhesive contains approximately 100% solids, by weight.

16. The method, as in claim 8, wherein said carton sealing/forming means is further comprised of:

a plurality of rollers or belts.

17. The method, as in claim 8, wherein said carton sealing/forming means is further comprised of:

a plurality of rollers and belts.

* * * * *